United States Patent
Yoon et al.

(10) Patent No.: US 11,809,056 B2
(45) Date of Patent: Nov. 7, 2023

(54) APPARATUS HAVING VARIABLE TRANSMITTANCE

(71) Applicant: LG Chem, Ltd., Seoul (KR)

(72) Inventors: Young Sik Yoon, Daejeon (KR); Tae Gyun Kwon, Daejeon (KR); Moon Soo Park, Daejeon (KR)

(73) Assignee: LG Chem, Ltd.

( * ) Notice: Subject to any disclaimer, the term of this patent is extended or adjusted under 35 U.S.C. 154(b) by 314 days.

(21) Appl. No.: 16/761,139

(22) PCT Filed: Nov. 2, 2018

(86) PCT No.: PCT/KR2018/013269
§ 371 (c)(1),
(2) Date: May 1, 2020

(87) PCT Pub. No.: WO2019/088768
PCT Pub. Date: May 9, 2019

(65) Prior Publication Data
US 2021/0116773 A1     Apr. 22, 2021

(30) Foreign Application Priority Data
Nov. 3, 2017    (KR) .......................... 10-2017-0145698

(51) Int. Cl.
    *G02F 1/1676*     (2019.01)
    *G02F 1/167*     (2019.01)
    *E06B 9/68*     (2006.01)

(52) U.S. Cl.
    CPC ............ *G02F 1/1676* (2019.01); *G02F 1/167* (2013.01); *E06B 9/68* (2013.01); *E06B 2009/6827* (2013.01)

(58) Field of Classification Search
    CPC .................. G02F 1/1676; G02F 1/167; G02F 2001/1678; G02F 1/1685; G02F 2203/01;
(Continued)

(56) References Cited

U.S. PATENT DOCUMENTS

2001/0030639 A1* 10/2001 Goden .................... G02F 1/167
    345/107
2004/0145696 A1* 7/2004 Oue ...................... G02F 1/1679
    349/167

(Continued)

FOREIGN PATENT DOCUMENTS

JP    2005115066 A    4/2005
JP    2008500592 A    1/2008

(Continued)

OTHER PUBLICATIONS

International Search Report for Application No. PCT/KR2018/013269 dated Feb. 15, 2019, 3 pages.

*Primary Examiner* — Jeff Piziali
(74) *Attorney, Agent, or Firm* — Lerner David LLP

(57) ABSTRACT

The present disclosure relates to a transmittance-variable device, a driving method thereof, a method for improving a light shielding ratio, and a use thereof. In some embodiments, a transmittance-variable device includes a transmittance-variable film capable of being switched between a transparent mode and a black mode depending on application of a voltage signal, and a power source for applying a voltage signal such that the intensity of the voltage signal decreases with time to implement the black mode, wherein the transmittance-variable film includes a first electrode substrate, an electrophoretic layer, and a second electrode substrate sequentially arranged. The transmittance-variable device can exhibit an excellent light shielding ratio in the black mode after driving with a voltage signal, and such a transmittance-variable device can be usefully used in a smart window.

20 Claims, 4 Drawing Sheets

(58) Field of Classification Search
CPC ............... E06B 9/68; E06B 2009/6827; E06B 2009/2464; E06B 9/24; G09G 3/344
See application file for complete search history.

(56) References Cited

U.S. PATENT DOCUMENTS

| | | | |
|---|---|---|---|
| 2005/0111075 A1* | 5/2005 | Kaneko | G02F 1/13394 359/296 |
| 2006/0023296 A1 | 2/2006 | Whitesides et al. | |
| 2009/0261332 A1 | 10/2009 | Shin et al. | |
| 2009/0267969 A1* | 10/2009 | Sakamoto | G09G 3/344 345/690 |
| 2011/0193841 A1* | 8/2011 | Amundson | G02F 1/167 345/208 |
| 2012/0188295 A1* | 7/2012 | Joo | G02F 1/1685 345/690 |
| 2014/0340430 A1* | 11/2014 | Telfer | G02F 1/1685 345/107 |
| 2016/0012762 A1 | 1/2016 | Joo et al. | |
| 2016/0232835 A1 | 8/2016 | Paolini, Jr. et al. | |
| 2017/0153525 A1* | 6/2017 | Lim | G02F 1/133345 |

FOREIGN PATENT DOCUMENTS

| | | | | |
|---|---|---|---|---|
| JP | 2008256987 A | * | 10/2008 | ............... G09G 3/34 |
| JP | 2008256987 A | | 10/2008 | |
| JP | 2013024924 A | * | 2/2013 | ............... G09G 3/34 |
| JP | 2014035385 A | | 2/2014 | |
| JP | 2016511447 A | | 4/2016 | |
| JP | 2016540249 A | | 12/2016 | |
| KR | 20090110099 A | | 10/2009 | |
| KR | 101241306 B1 | | 3/2013 | |
| KR | 20150062240 A | | 6/2015 | |
| KR | 101632712 B1 | | 6/2016 | |
| KR | 20170089925 A | | 8/2017 | |

* cited by examiner

[Figure 1]
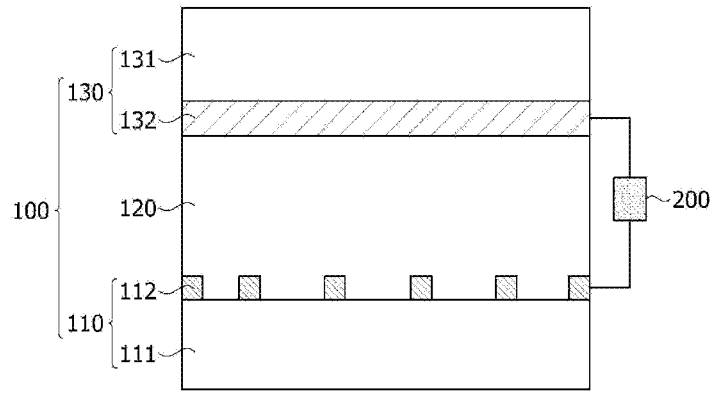
[Figure 2]
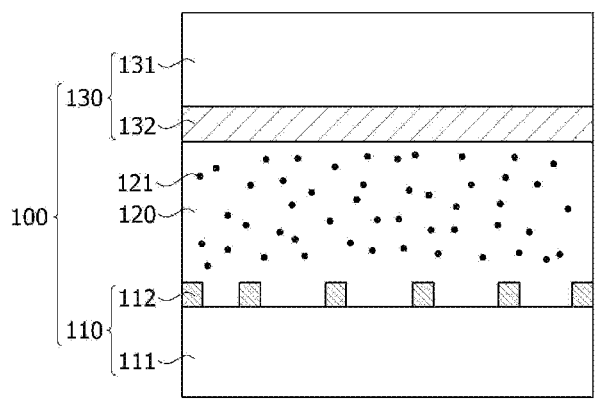
[Figure 3]
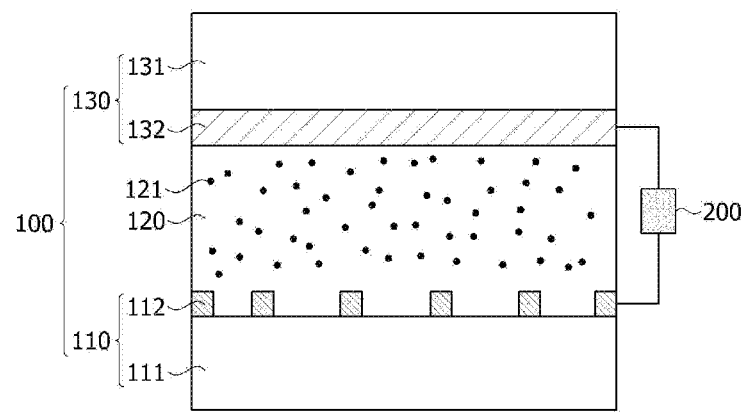

[Figure 4]
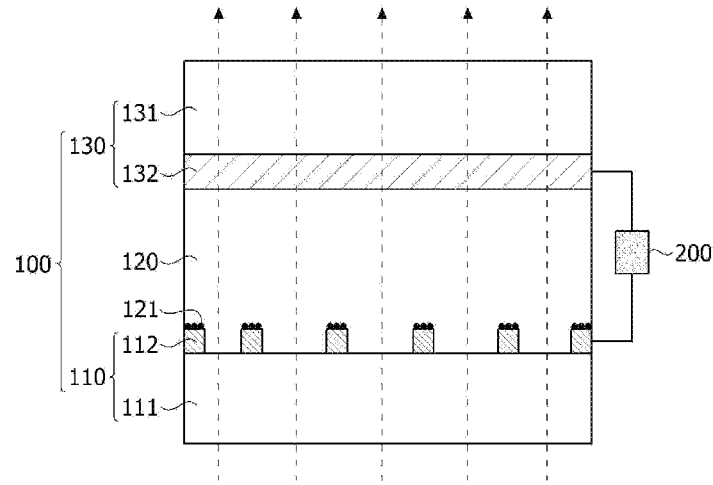
[Figure 5]
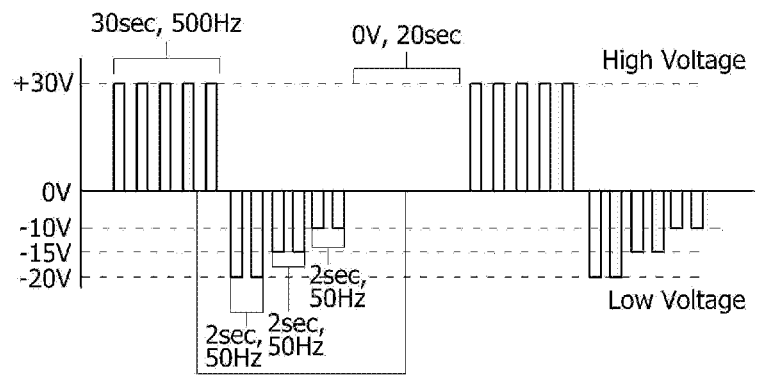
[Figure 6]
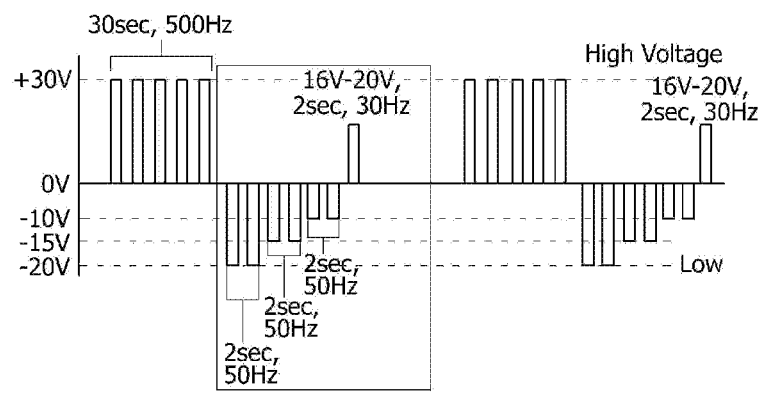

[Figure 7]
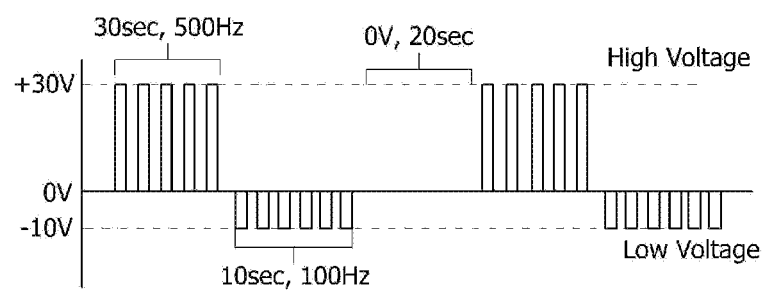
[Figure 8]
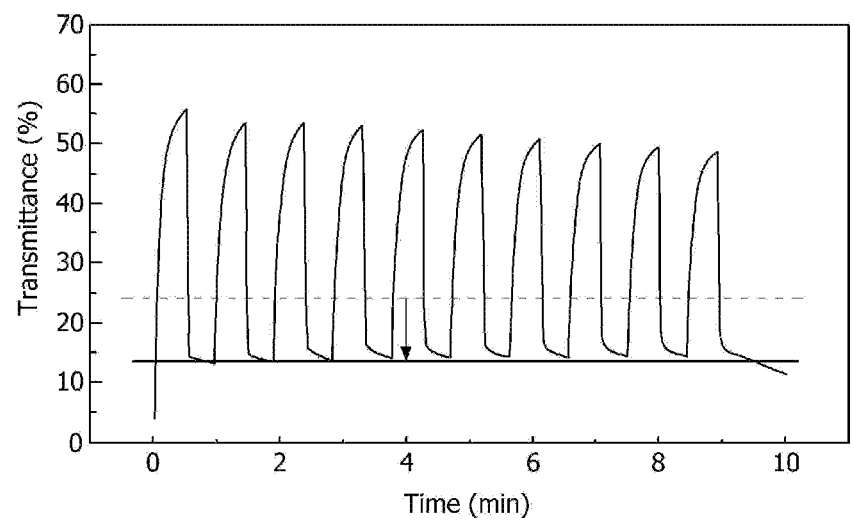

[Figure 9]
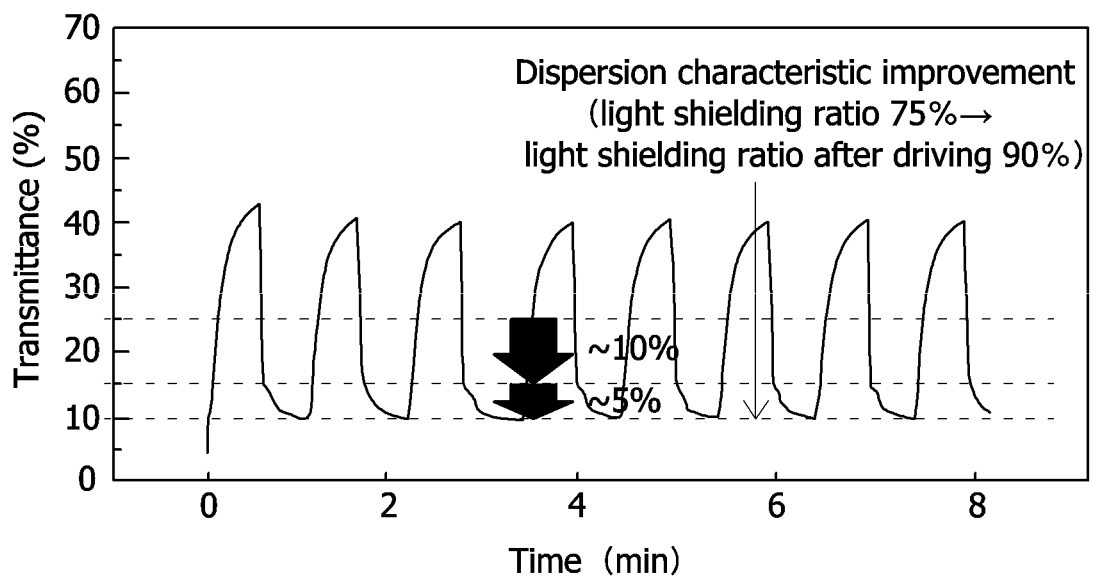
[Figure 10]
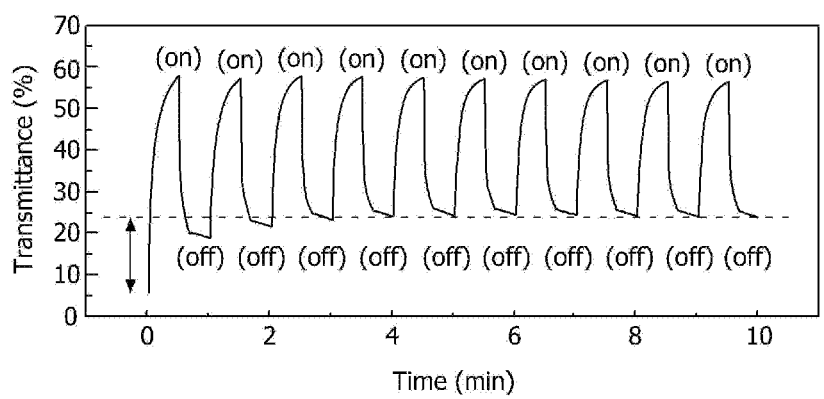

APPARATUS HAVING VARIABLE TRANSMITTANCE

CROSS-REFERENCE TO RELATED APPLICATION(S)

The present application is a National Phase entry under 35 U.S.C. § 371 of International Application No. PCT/KR2018/013269, filed on Nov. 2, 2018, which claims priority from Korean Patent Application No. 10-2017-0145698 filed on Nov. 3, 2017, the disclosures of which are incorporated by reference herein.

TECHNICAL FIELD

This disclosure relates to a transmittance-variable device, a driving method thereof, a method for improving a light shielding ratio, and a use thereof.

BACKGROUND ART

A transmittance-variable film may sequentially comprise a first electrode substrate on which an overall electrode layer is formed, an electrophoretic layer, and a second electrode substrate on which a pattern electrode layer is formed, where the electrophoretic layer may be equipped with charged particles in the form of particles capable of exhibiting an electrophoretic phenomenon by external force applied from the outside.

In Patent Document 1 (Korean Patent Publication No. 10-1241306), a negatively charged substance was used as charged particles and the charged particles existed in a state dispersed in the electrophoretic layer at the beginning without external force applied from the outside, and in the case of being irradiated with light between the patterns of the pattern electrode layer formed on the second electrode substrate, a black mode for blocking the light was implemented. At this time, the charged particles may be moved on the patterns of the pattern electrode layer by applying a positive voltage to the pattern electrode layer formed on the second electrode substrate and applying a negative voltage to the overall electrode layer formed on the first electrode substrate to realize a transparent mode that the light can be transmitted between the patterns of the pattern electrode layer. Thereafter, when a voltage is not applied to the pattern electrode layer or a negative voltage, which is the reverse voltage, is applied to the pattern electrode layer, the charged particles may be dispersed again to realize the black mode.

However, in the transmittance-variable film using such an electrophoretic phenomenon, due to the repetition of the pulse signal after driving, the dispersibility of the charged particles is lowered when the black mode is implemented, whereby there has been a problem that the light shielding ratio is significantly reduced as compared with the black mode before driving. Therefore, a transmittance-variable device is required to solve such a problem.

BRIEF DESCRIPTION OF DRAWINGS

FIG. 1 is a diagram illustratively showing a transmittance-variable device according to one example of the present disclosure.

FIG. 2 is a diagram illustratively showing a transmittance-variable device implementing an early black mode according to one example of the present disclosure.

FIG. 3 is a diagram illustratively showing a transmittance-variable device implementing a black mode after driving according to one example of the present disclosure.

FIG. 4 is a diagram illustratively showing a transmittance-variable device implementing a transparent mode after driving according to one example of the present disclosure.

FIG. 5 is a graph showing a voltage signal applied to the transmittance-variable device manufactured in Example 1 of the present disclosure.

FIG. 6 is a graph showing a voltage signal applied to the transmittance-variable device manufactured in Example 2 of the present disclosure.

FIG. 7 is a graph showing a voltage signal applied to the transmittance-variable device manufactured in Comparative Example 1 of the present disclosure.

FIG. 8 is a graph showing the transmittance of the transmittance-variable device manufactured in Example 1 of the present disclosure according to the voltage signal application.

FIG. 9 is a graph showing the transmittance of the transmittance-variable device manufactured in Example 2 of the present disclosure according to the voltage signal application.

FIG. 10 is a graph showing the transmittance of the transmittance-variable device manufactured in Comparative Example 1 of the present disclosure according to the voltage signal application.

EXPLANATION OF REFERENCE NUMERALS

100: transmittance-variable film
110: first electrode substrate
111: first base film
112: pattern electrode layer
120: electrophoretic layer
121: charged particles
130: second electrode substrate
131: second base film
132: overall electrode layer
200: power source

DISCLOSURE

Technical Problem

It is an object of the present disclosure to provide a transmittance-variable device capable of exhibiting an excellent light shielding ratio by applying a voltage signal so that after driving a transmittance-variable film, an intensity of a voltage decreases with time upon implementation of a black mode, a driving method thereof, a method for improving a light shielding ratio, and a use thereof.

Technical Solution

The present disclosure relates to a transmittance-variable device. According to an exemplary transmittance-variable device of the present disclosure, it can exhibit an excellent light shielding ratio by applying a voltage signal so that after driving a transmittance-variable film, an intensity of a voltage signal decreases with time to implement a black mode. In this specification, the term "voltage signal" means a voltage whose intensity, application time and frequency have each one specific value.

Hereinafter, the transmittance-variable device of the present disclosure will be described with reference to the accompanying drawings, where the attached drawings are illustrative and the transmittance-variable device of the present disclosure is not limited to the attached drawings.

FIG. 1 illustratively shows a transmittance-variable device according to one example of the present disclosure. As shown in FIG. 1, the transmittance-variable device comprises a transmittance-variable film (100) and a power source (200). The transmittance-variable film (100) comprises a first electrode substrate (110), an electrophoretic layer (120) and a second electrode substrate (130) sequentially.

The first electrode substrate (110) and the second electrode substrate (130) are portions, to which a voltage is applied from the power source (200), in order to realize an electrophoretic phenomenon of charged particles in the transmittance-variable film. In one example, any one of the first electrode substrate (110) and the second electrode substrate (130) may comprise a pattern electrode layer (112), and the other may comprise an overall electrode layer (132). Specifically, the first electrode substrate (110) may comprise a pattern electrode layer (112) formed on a first base film (111) and the second electrode substrate (130) may comprise an overall electrode layer (132) formed on a second base film (131).

In this specification, the pattern electrode layer means that the electrode is formed in a pattern shape, where the pattern shape can be appropriately selected in consideration of the object of the present disclosure. For example, the pattern shape may be a mesh shape, a stripe shape or a Voronoi shape.

Also, the overall electrode layer herein means that it is formed on the entire one surface of the base film.

As the first and second base films (111, 131), those having optical transparency can be used. For example, as the first and second base films (111, 131), an optically transparent plastic film or sheet can be used or glass can be used. Specifically, the plastic film or sheet can be exemplified by a cellulose film or sheet such as a DAC (diacetyl cellulose) or TAC (triacetyl cellulose) film or sheet; a COP (cycloolefin copolymer) film or sheet such as a norbornene derivative resin film or sheet; an acrylic film or sheet such as a PMMA (poly(methyl methacrylate)) film or sheet; a PC (polycarbonate) film or sheet; an olefin film or sheet such as a PE (polyethylene) or PP (polypropylene) film or sheet; a PVA (polyvinyl alcohol) film or sheet; a PES (poly ether sulfone) film or sheet; a PEEK (polyether ether ketone) film or sheet; a PEI (polyetherimide) film or sheet; a PEN (polyethylenenaphthatate) film or sheet; a polyester film or sheet such as a PET (polyethyleneterephtalate) film or sheet; a PI (polyimide) film or sheet; a PSF (polysulfone) film or sheet; a PAR (polyarylate) film or sheet; or a fluorine-based resin film or sheet, and the like, and generally, a cellulose film or sheet, a polyester film or sheet, or an acrylic film or sheet, and the like can be used, and preferably, a TAC film or sheet can be used, but it can be suitably selected in consideration of the purpose of the present disclosure.

As the pattern electrode layer (112) and the overall electrode layer (132), a transparent conductive layer may be used. For example, as the pattern electrode layer (112) and the overall electrode layer (132), those formed by depositing a conductive polymer, a conductive metal, a conductive nanowire or a metal oxide such as ITO (indium tin oxide), and the like may be used. Specifically, aluminum (Al) may be used as the pattern electrode layer (112), and indium tin oxide (ITO) may be used as the overall electrode layer (132).

The electrophoretic layer (120) is a portion that changes light transmittance by charged particles. Specifically, the light transmittance may be adjusted to express the desired color by an electrophoresis method in which charged particles are rotated or move closer to an electrode with different polarity depending on voltage application to the pattern electrode layer (112) and the overall electrode layer (132) existing in upper and lower parts of the electrophoretic layer (120).

In one example, the electrophoretic layer (120) may comprise a dispersion solvent and charged particles. As the charged particles, positively (+) or negatively (−) charged particles can be used. For example, one or more charged particles selected from the group consisting of carbon black, ferric oxides, chromium copper (CrCu) and aniline black can be used, and preferably, carbon black particles can be used. Furthermore, as the dispersion solvent for dispersing the charged particles, a known solvent such as a hydrocarbon-based solvent may be used without limitation. For example, as the hydrocarbon-based solvent, a common alkane solvent such as pentane, hexane, heptane, octane, nonane, decane, undecane, dodecane, or an isomer or mixture thereof may be used. In addition, as the dispersion solvent, an isoparaffinic solvent such as an alkane mixture substance having 6 to 13 carbon atoms may be used. For example, Isopar C, Isopar G, Isopar E (Exxon), ISOL-C(SK Chem) or ISOL-G (Exxon), and the like can be used as the isoparaffinic solvent.

The content of the charged particles in the electrophoretic layer may be 0.5 wt % to 5 wt %. When the content of the charged particles is within the above range, it may be advantageous in terms of providing a transmittance-variable device having excellent transmittance-variable characteristics.

The charged particles may be dispersed in the dispersion solvent to implement the black mode, and may move to the pattern electrode (112) to implement the transparent mode. For example, as shown in FIG. 2, the transmittance-variable film (100) may be implemented in the black mode, as the charged particles (121) in the electrophoretic layer (120) are dispersed in the dispersion solvent to exist in the initial state where a voltage is not applied to the overall electrode (132) and the pattern electrode (112) existing on the upper and lower parts of the electrophoretic layer (120). Also, as shown in FIG. 3, when the charged particles (121) bear negative charges, a negative voltage is applied to the pattern electrode layer (112) and the overall electrode layer (132) existing on the upper and lower parts of the electrophoretic layer (120), the repulsive force acts between the charged particles (121) and the pattern electrode layer (112) and the overall electrode layer (132), so that the charged particles are dispersed in a particle state in the electrophoretic layer (120), whereby the transmittance-variable film (100) may implement the black mode. At this time, as shown in FIG. 4, when the transmittance-variable film (100) applies a positive voltage to the pattern electrode layer (112), the repulsive force acts between the charged particles (121) and the overall electrode layer (132), and the attractive force acts between the charged particles (121) and the pattern electrode layer (112), so that the charged particles (121) move to the pattern electrode layer (112), whereby the transparent mode can be implemented.

As described above, the transmittance-variable film (100) switches between the transparent mode and the black mode depending on voltage application.

The power source (200) is a device for supplying the transmittance-variable film (100) with a voltage applied to vary the transmittance. The power source (200) may apply a voltage signal such that the intensity of the voltage decreases with time to implement the black mode.

The power source (200) may apply a square-wave voltage signal. Specifically, the power source (200) applies a direct voltage for a predetermined period of time in order to maintain the transparent mode or the black mode of the transmittance-variable film (100) and applies an alternating voltage when switching between the transparent mode and the black mode, so that the waveform of the voltage signal can represent a quadrangle.

The power source (200) may apply a voltage signal such that the intensity of the voltage gradually decreases or decreases in steps with time to implement the black mode. In this specification, the term "gradual" means having a continuous slope with time. In this specification, the term "step" means that two or more different sections have a slope like a step shape with time. The transmittance-variable film (100) may exhibit an excellent light shielding ratio in the black mode after driving by applying a voltage signal from the power source (200) such that the intensity of the voltage gradually decreases or decreases in steps with time.

In one example, the power source (200) may apply a voltage signal such that the intensity of the voltage decreases from −25 V to −5 V with time to implement the black mode. Specifically, the power source (200) may apply a voltage signal such that the voltage intensity decreases from −24 V to −6 V, from −23 V to −7 V, from −22 V to −8 V, from −21 V to −9 V or from −20 V to −10 V with time to implement the black mode of the transmittance-variable film (100). In the power source (200), if the absolute value of the voltage intensity applied to implement the black mode of the transmittance-variable film (100) is excessively large, there may be a problem that the charged particles excessively move to deteriorate blocking characteristics.

In one embodiment, the power source (200) applies a plurality of voltage signals in which the intensity of the voltage signal decreases in steps with time to implement the black mode, where the plurality of voltage signals may each have the same time and frequency. Specifically, when two or more plural voltage signals having different voltage intensities are applied so that the voltage intensity of the voltage signal applied from the power source (200) decreases in steps with time to implement the black mode, the two or more plural voltage signals may be applied at the same time and frequency.

In one example, the power source (200) may have a frequency of the voltage signal applied to implement the black mode of 30 Hz to 100 Hz, and specifically, the upper limit of the frequency may be 80 Hz or less, or 60 Hz or less and the lower limit of the frequency may be 35 Hz or more, 40 Hz or more, or 45 Hz or more. The power source (200) can apply a pulse voltage signal through a low frequency by applying a voltage signal having a frequency in the above-described range such that the intensity of the voltage signal decreases in steps with time, whereby the dispersion characteristics of the charged particles can be maximized. In addition, the power source (200) may have an application time of the voltage signal applied to implement the black mode of 10 seconds or less, and specifically, 8 seconds or less, 6 seconds or less, or 4 seconds or less, and the lower limit of the application time may be 2 seconds or more within the above-described range. As the power source (200) applies a voltage signal having an application time in the above-described range such that the intensity of the voltage signal decreases in steps with time to implement the black mode, it is possible to exhibit an excellent light shielding ratio in the black mode after driving with the voltage signal.

The power source (200) may maintain 0 V after application of a voltage signal to implement the black mode. Specifically, the state of the charged particles dispersed to implement the black mode can be stabilized by maintaining the voltage signal from the power source (200) at 0 V, that is, a state where the voltage signal is not applied for a period of 0.5 seconds to 20 seconds.

Furthermore, the power source (200) may further apply a reverse voltage signal after application of a minimum intensity voltage signal to implement the black mode. For example, when a negative voltage signal is applied from the power source (200) so that the intensity of the voltage signal decreases with time to implement the black mode, the minimum intensity voltage signal closest to 0 V can be applied, and then a positive voltage signal, which is a reverse voltage signal to the negative voltage signal, can be further be applied. As the power source (200) applies the reverse voltage signal after application of the minimum intensity voltage signal to implement the black mode, the residual voltage can be eliminated, which can be generated by applying the negative voltage signal for a long time.

In one example, the reverse voltage signal may have a voltage intensity of 10 V to 20 V, a frequency of 10 Hz to 50 Hz and an application time of 10 seconds or less. As the reverse voltage signal is applied at the voltage intensity, frequency and time within the above-described range, the light shielding ratio in the black mode can be further improved by eliminating the residual voltage that can be generated by applying the negative voltage signal for a long time.

Specifically, the reverse voltage signal can be appropriately selected within the above-described range in consideration of the purpose of the present disclosure. For example, in the reverse voltage signal, the upper limit of the voltage intensity may be 20 V or less, or 18 V or less within the above-described range, and the lower limit of the voltage intensity may be 10 V or more within the above-described range. Also, in the reverse voltage signal, the upper limit of the frequency may be 45 Hz or less, 40 Hz or less, or 35 Hz or less within the above-described range, and the lower limit of the frequency may be 15 Hz or more, 20 Hz or more, or 25 Hz or more within the above-described range. Specifically, the frequency of the reverse voltage signal may be 25 Hz to 35 Hz, 27 Hz to 33 Hz, or 29 Hz to 31 Hz, and may be, for example, 30 Hz. Furthermore, in the reverse voltage signal, the upper limit of the application time may be 8 seconds or less, 6 seconds or less, or 4 seconds or less within the above-described range, and the lower limit of the application time may be 2 seconds or more within the above-described range.

The power source (200) may apply a constant voltage signal with time to implement the transparent mode. Specifically, the power source (200) can maintain the transparent mode by applying a direct voltage having one voltage intensity for a predetermined time to implement the transparent mode of the transmittance-variable film (100).

In one example, the absolute value of the voltage signal to implement the transparent mode may be greater than the absolute value of the voltage signal to implement the black mode. For example, the difference between the absolute value of the voltage signal to implement the transparent mode and the absolute value of the voltage to implement the black mode after driving may be 5 V to 45 V, and specifically, may be 6 V to 40 V, 7 V to 35 V, 8 V to 30 V, 9 V to 25 V, or 10 V to 20 V. If the difference between the absolute value of the voltage signal to implement the transparent mode and the absolute value of the voltage to implement the black mode after driving becomes too large, there may be a problem that the blocking characteristics are lowered due to sudden movement of the charged particles.

The power source (200) may apply a voltage signal having a voltage intensity of 10 V to 50 V, a frequency of 300 Hz to 700 Hz and an application time of 10 seconds to 50 seconds to implement the transparent mode, but they may be appropriately selected within the above-described range in consideration of the purpose of the present disclosure. For example, in the voltage signal applied at the time of the transparent mode implementation, the voltage intensity may be 15 V to 45 V, 20 V to 40 V, or 25 V to 35 V within the above-described range. If the voltage signal applied to implement the transparent mode is too low, there may be a problem such that the transparent mode is not implemented, whereas if the voltage signal applied to implement the transparent mode is too high, there may be a problem that the charged particles are damaged or the electrophoretic layer is damaged. Also, in the voltage signal applied to implement the transparent mode, the frequency may be 450 Hz to 650 Hz, 400 Hz to 600 Hz, or 350 Hz to 550 Hz within the above-described range. The transparent mode driving characteristic can be improved as the frequency of the voltage signal applied to implement the transparent mode is higher within the above-described range. Furthermore, in the voltage signal applied to implement the transparent mode, the application time may be 15 seconds to 45 seconds, 20 seconds to 40 seconds, or 25 seconds to 35 seconds within the above-described range, but the application time of the voltage signal may be appropriately selected to maintain the desired time of the transparent mode.

The transmittance-variable film (100) may satisfy Equation 1 below.

$$T_{DAB} - T_{DBB} < 13\% \qquad \text{[Equation 1]}$$

In Equation 1 above, $T_{DAB}$ is the transmittance in the black mode after driving with a voltage signal, and $T_{DBB}$ is the transmittance in the black mode before driving with a voltage signal.

Specifically, in the transmittance-variable film (100), the upper limit of the difference between the transmittance in the black mode after driving and the transmittance in the black mode before driving may be 12% or less, and the lower limit may be more than 0%, and may be 1% or more, or 3% or more. As the difference between the transmittance in the black mode after driving and the transmittance in the black mode before driving satisfies Equation 1 above, the transmittance-variable film (100) can be implemented in the black mode having an excellent light shielding ratio that the transmittance in the black mode after driving shows a numerical value similar to the transmittance in the black mode before driving.

Specifically, the transmittance-variable film (100) may have the transmittance in the black mode before driving of 20% or less, 15% or less, 10% or less, or 5% or less. The transmittance-variable film (100) may be implemented in the black mode having a light shielding ratio of 95% or more, for example, by having the transmittance within the above-described range.

In addition, the transmittance-variable film may have the transmittance in the black mode after driving of less than 18%. Specifically, the transmittance in the black mode after driving of the transmittance-variable film (100) may be 17% or less. The lower limit of the transmittance may be, for example, more than 5%, 7% or more, 9% or more, or 10% or more. The transmittance-variable film (100) may be implemented, for example, in the black mode having an excellent light shielding ratio of more than 82% after driving, by having the transmittance in the above-described range.

Furthermore, as described above, the transmittance-variable film (100) may have the transmittance in the transparent mode after driving of 20% or more by applying a voltage signal from the power source (200). Specifically, the transmittance-variable film (100) may have the transmittance in the transparent mode after driving of 30% or more, or 40% or more. The upper limit of the transmittance may be, for example, 80% or less, 70% or less, or 60% or less. The transmittance-variable film (100) may be switched from the black mode to the transparent mode again after driving, by having the transmittance within the above-described range.

The present disclosure also relates to a method of driving a transmittance-variable device. For example, the driving method of the transmittance-variable device relates to a method of driving the transmittance-variable device through the above-described transmittance-variable device. Therefore, the contents described in the transmittance-variable device can be equally to details of the driving method of the transmittance-variable device to be described below.

An exemplary method of driving a transmittance-variable device of the present disclosure comprises applying a voltage signal to a transmittance-variable film of a transmittance-variable device, which comprises a first electrode substrate, an electrophoretic layer and a second electrode substrate sequentially and switches between a transparent mode and a black mode depending on voltage application, such that the intensity of the voltage signal decreases with time to implement the black mode. The details of the transmittance-variable film and the voltage signal application are the same as those described in the transmittance-variable device, and thus will be omitted. As the transmittance-variable device is driven through the above-described method, it can implement the black mode of the transmittance-variable film having an excellent light shielding ratio.

The present disclosure also relates to a method for improving a light shielding ratio of a transmittance-variable device. For example, the improvement method of the transmittance-variable device relates to a method for improving a light shielding ratio of the transmittance-variable device through the above-described transmittance-variable device. Therefore, the contents described in the transmittance-variable device can be equally applied to details of the method for improving a light shielding ratio of a transmittance-variable device to be described below.

An exemplary method for improving a light shielding ratio of a transmittance-variable device of the present disclosure comprises applying a voltage signal to a transmittance-variable film of a transmittance-variable device, which comprises a first electrode substrate, an electrophoretic layer and a second electrode substrate sequentially and switches between a transparent mode and a black mode depending on voltage application, such that the intensity of the voltage signal decreases with time to implement the black mode. The details of the transmittance-variable film and the voltage signal application are the same as those described in the transmittance-variable device, and thus will be omitted. As the transmittance-variable device improves the light shielding ratio through the above method, it can implement the black mode of the transmittance-variable film having an excellent light shielding ratio after driving.

The present disclosure also relates to a use of the transmittance-variable device. The transmittance-variable device of the present disclosure can switch between the transparent mode and the black mode depending on voltage application, and have an excellent light shielding ratio in the black mode after driving with a voltage signal. Such a transmittance-variable device can be applied, for example, to a smart window. In this specification, the term "smart window" means a window having a function of controlling the transmittance of incident light, for example, sunlight, which is a concept that encompasses functional elements named a so-called smart blind, electronic curtain, transmittance-variable glass or dimming glass, and the like. The method of constructing such a smart window is not particularly limited, and a conventional method may be applied as long as the transmittance-variable device is included.

Advantageous Effects

The transmittance-variable device of the present disclosure can exhibit an excellent light shielding ratio in the black mode after driving with a voltage signal, and such a transmittance-variable device can be usefully used in a smart window.

BEST MODE

Hereinafter, the present disclosure will be specifically described by way of the examples, but the scope of the present disclosure is not limited by the following examples.

Example 1

Preparation of Composition for Electrophoretic Layer

A composition for an electrophoretic layer was prepared by dispersing 3.5 wt % of carbon black having a particle diameter of 200 nm in a non-polar hydrocarbon solvent (Isopar G, EXXONMOBIL CHEMICAL).

Production of First Electrode Substrate

A first electrode substrate was produced by forming an Al metal mesh on a polyethylene terephthalate film (width×length=100 mm×100 mm) through reverse offset printing to have a line width in the range of 3 μm, an average pitch of 50 μm and a thickness of 145 nm.

Production of Second Electrode Substrate

A second electrode substrate was produced by forming an ITO electrode on the entire surface of a polyethylene terephthalate film (width×length=100 mm×100 mm) to have a thickness of 100 nm using a sputtering method.

Production of Transmittance-Variable Film

After applying the composition for an electrophoretic layer on the Al metal mesh of the first electrode substrate, the second electrode substrate was laminated so that the ITO electrode of the second electrode substrate was in contact with the composition for an electrophoretic layer to produce a transmittance-variable film.

Manufacturing of Transmittance-Variable Device

A transmittance-variable device was manufactured by connecting an NF programmable AC/DC power source EC1000S (NF Corporation) as a power source to the transmittance-variable film produced in the above such that the (+) voltage was applied to the first electrode formed on the first electrode substrate and the (−) voltage was applied to the second electrode formed on the second electrode substrate. At this time, as shown in FIG. 5, in order to implement the transmittance-variable film in the black mode, the voltage signals were applied to the electrophoretic layer in the intensity order of −20 V, −15 V and −10 V at a frequency of 50 Hz for 2 seconds, respectively. Thereafter, in order to maintain the transmittance-variable film in the black mode, the film was held in a state where no voltage was applied (0 V) for 20 seconds. Furthermore, in order to implement the transmittance-variable film from the black mode to the transparent mode, a voltage of 30 V was applied to the electrophoretic layer at a frequency of 500 Hz for 30 seconds.

Example 2

As shown in FIG. 6, a transmittance-variable device was manufactured in the same manner as in Example 1, except that in order to implement the transmittance-variable film in the black mode, the voltage signals were applied to the electrophoretic layer in the intensity order of −20 V, −15 V and −10 V at a frequency of 50 Hz for 2 seconds, respectively, and then a voltage of 18 V was further applied thereto at a frequency of 30 Hz for 2 seconds.

Example 3

A transmittance-variable device was manufactured in the same manner as in Example 1 above, except that in order to implement the transmittance-variable film in the black mode, all the frequencies of the voltage signals applied to the electrophoretic layer in the intensity order of −20 V, −15 V and −10 V, respectively, were changed to 100 Hz and the voltage signal was applied for 10 seconds.

Comparative Example 1

As shown in FIG. 7, a transmittance-variable device was manufactured in the same manner as in Example 1 above, except that in order to implement the transmittance-variable film in the black mode, the voltage signals applied to the electrophoretic layer were not formed in steps and only −10 V was applied thereto, the frequency of the voltage signal was changed to 100 Hz, and the voltage signal was applied for 10 seconds.

Comparative Example 2

A transmittance-variable device was manufactured in the same manner as in Example 1 above, except that in order to implement the transmittance-variable film in the black mode, the voltage signals applied to the electrophoretic layer were not formed in steps and only −10 V was applied thereto.

Evaluation Example. Evaluation of Transmittance According to Voltage Signal

Through the transmittance-variable devices of Examples and Comparative Examples above, the transmittance of the transmittance-variable films implemented at the time of switching between the transparent mode and the black mode was measured as transmittance changes for visible light before and after voltage application using an electro-optic instrument (LCMS-200, Sesim Photonics Technology) and the results were represented in Table 1 below.

TABLE 1

|  | Black Mode before driving (0 V) | Transparent Mode after Driving | Black Mode after Driving |
|---|---|---|---|
| Example 1 | 5% | 52% | 15% |
| Example 2 | 5% | 40% | 10% |
| Example 3 | 5% | 57% | 17% |

TABLE 1-continued

| | Black Mode before driving (0 V) | Transparent Mode after Driving | Black Mode after Driving |
|---|---|---|---|
| Comparative Example 1 | 5% | 57% | 25% |
| Comparative Example 2 | 5% | 52% | 18% |

As shown in Table 1, it can be confirmed, as in the transmittance-variable devices of Examples 1 to 3, that if the voltage signal is applied to the electrophoretic layer such that the intensity of the voltage decreases with time upon implementation of the transmittance-variable film from the transparent mode to the black mode, it represents the transmittance of a value similar to the transmittance in the early black mode, that is, the black mode upon no voltage application (0 V). In particular, in the case of the transmittance-variable device of Example 1, as shown in FIG. 8, it can be confirmed that the transmittance in the black mode after driving is 15%, that is, the light shielding ratio is 85%. In addition, in the case of the transmittance-variable device of Example 2, as shown in FIG. 9, it can be confirmed that the transmittance is 10%, that is, the light shielding ratio is 90% due to the application of the reverse voltage signal in the black mode after driving.

On the other hand, it can be confirmed, as in the transmittance-variable devices of Comparative Examples 1 and 2, that if the voltage applied to the electrophoretic layer is not applied in steps and the single voltage signal is applied upon implementation of the transmittance-variable film from the transparent mode to the black mode, the transmittance differs greatly from the transmittance in the early black mode. In particular, in the case of the transmittance-variable device of Comparative Example 1, as shown in FIG. 10, it can be confirmed that the transmittance in the black mode after driving is 25%, that is, the light shielding ratio is 75%.

Therefore, it was confirmed that when the transmittance-variable devices of Examples 1 to 3 were used, the light shielding ratio in the black mode after driving was superior to that of the transmittance-variable devices of Comparative Examples 1 and 2.

The invention claimed is:

1. A transmittance-variable device, comprising:
a transmittance-variable film capable of being switched between a transparent mode and a black mode by application of a voltage signal; and
a power source for applying a positive voltage signal and a negative voltage signal,
wherein the transparent mode is implemented by applying and maintaining the positive voltage signal, and
wherein the black mode is implemented by applying the negative voltage signal such that the intensity of the negative voltage signal decreases with time,
wherein the transmittance-variable film comprises:
a first electrode substrate, an electrophoretic layer, and a second electrode substrate sequentially arranged,
wherein the power source applies the negative voltage signal such that the intensity of the voltage signal decreases from −25 V to −5 V with time to implement the black mode.

2. The transmittance-variable device according to claim 1, wherein the first electrode substrate comprises a pattern electrode layer and the second electrode substrate comprises an overall electrode layer.

3. The transmittance-variable device according to claim 1, wherein the electrophoretic layer comprises a dispersion solvent and charged particles.

4. The transmittance-variable device according to claim 3, wherein the charged particles comprise one or more particles selected from the group consisting of carbon black, ferric oxides, chromium copper (CrCu) and aniline black.

5. The transmittance-variable device according to claim 4, wherein the charged particles are dispersed in the dispersion solvent to implement the black mode, and
wherein the charged particles move to the pattern electrode layer to implement the transparent mode.

6. The transmittance-variable device according to claim 1, wherein the power source applies a square-wave voltage signal for the positive voltage signal and the negative voltage signal.

7. The transmittance-variable device according to claim 1, wherein the power source applies the negative voltage signal such that the intensity of the negative voltage signal decreases with a continuous slope or decreases in steps with time to implement the black mode.

8. The transmittance-variable device according to claim 7, wherein the power source applies a plurality of negative voltage signals in which the intensity of the negative voltage signals decreases in steps with time to implement the black mode, where the plurality of negative voltage signals each have the same time and frequency.

9. The transmittance-variable device according to claim 8, wherein the power source applies the negative voltage signal having a frequency of 30 Hz to 100 Hz and an application time of 10 seconds or less to implement the black mode.

10. The transmittance-variable device according to claim 8, wherein the power source maintains 0 V after application of the negative voltage signal to implement the black mode.

11. The transmittance-variable device according to claim 8, wherein the power source further applies a reverse positive voltage signal after application of a minimum intensity voltage signal in the plurality of negative voltage signals to implement the black mode.

12. The transmittance-variable device according to claim 11, wherein the reverse positive voltage signal has a voltage intensity of 10 V to 20 V, a frequency of 10 Hz to 50 Hz and an application time of 10 seconds or less.

13. The transmittance-variable device according to claim 1, wherein the power source applies the positive voltage signal having a constant voltage intensity with time to implement the transparent mode.

14. The transmittance-variable device according to claim 13, wherein an absolute value of the positive voltage to implement the transparent mode is larger than an absolute value of the negative voltage to implement the black mode.

15. The transmittance-variable device according to claim 14, wherein the power source applies the positive voltage signal having a voltage intensity of 10 V to 50 V, a frequency of 300 Hz to 700 Hz and an application time of 10 seconds to 50 seconds to implement the transparent mode.

16. The transmittance-variable device according to claim 1, wherein the transmittance-variable film satisfies Equation 1 below:

$$T_{DAB} - T_{DBB} < 13\% \quad \text{[Equation 1]}$$

wherein, $T_{DAB}$ is the transmittance in the black mode after driving with a voltage signal, and $T_{DBB}$ is the transmittance in the black mode before driving with a voltage signal.

17. The transmittance-variable device according to claim 1, wherein the transmittance-variable film has transmittance of less than 18% in the black mode after driving with the negative voltage signal, and transmittance of 20% or more in the transmittance mode after driving with the positive voltage signal.

18. A method of driving a transmittance-variable device, comprising:
applying a voltage signal to a transmittance-variable film of a transmittance-variable device, which is capable of switching between a transparent mode and a black mode based on application of a voltage signal,
wherein the transparent mode is implemented by applying and maintaining a positive voltage signal, and
wherein the black mode is implemented by applying a negative voltage signal such that the intensity of the negative voltage signal decreases with time,
wherein the transmittance-variable film comprises a first electrode substrate, an electrophoretic layer and a second electrode substrate sequentially arranged,
wherein the negative voltage signal is applied such that the intensity of the voltage signal decreases from −25 V to −5 V with time to implement the black mode.

19. A method for improving a light shielding ratio of a transmittance-variable device, comprising:
applying a voltage signal to a transmittance-variable film of a transmittance-variable device, which is capable of switching between a transparent mode and a black mode based on application of a voltage signal,
wherein the transparent mode is implemented by applying and maintaining a positive voltage signal, and
wherein the black mode is implemented by applying a negative voltage signal such that the intensity of the negative voltage signal decreases with time,
wherein the transmittance-variable film comprises a first electrode substrate, an electrophoretic layer and a second electrode substrate sequentially arranged,
wherein the negative voltage Signal is applied such that the intensity of the voltage signal decreases from −25 V to −5 V with time to implement the black mode.

20. A smart window comprising the transmittance-variable device of claim 1.

* * * * *